US010399845B2

(12) United States Patent
Lawrence et al.

(10) Patent No.: US 10,399,845 B2
(45) Date of Patent: Sep. 3, 2019

(54) TESTABLE OVERFILL PREVENTION VALVE FOR A LIQUID STORAGE CONTAINER

(71) Applicant: EMCO WHEATON RETAIL CORPORATION, Wilson, NC (US)

(72) Inventors: James L. Lawrence, Wilson, NC (US); Nicholas P. Clontz, Greenville, NC (US)

(73) Assignee: EMCO WHEATON RETAIL CORPORATION, Wilson, NC (US)

( * ) Notice: Subject to any disclaimer, the term of this patent is extended or adjusted under 35 U.S.C. 154(b) by 90 days.

(21) Appl. No.: 15/713,565

(22) Filed: Sep. 22, 2017

(65) Prior Publication Data

US 2019/0092618 A1     Mar. 28, 2019

(51) Int. Cl.
*B67D 7/36*     (2010.01)
*F16K 31/18*    (2006.01)
(Continued)

(52) U.S. Cl.
CPC ............ *B67D 7/365* (2013.01); *B65D 90/26* (2013.01); *F16K 17/044* (2013.01); *F16K 31/18* (2013.01);
(Continued)

(58) Field of Classification Search
CPC ...... F16K 1/165; F16K 1/2007; F16K 1/2021; F16K 15/181; F16K 31/20; F16K 31/24;
(Continued)

(56) References Cited

U.S. PATENT DOCUMENTS

| 501,398 A | 7/1893 | Bauer |
| 2,200,697 A * | 5/1940 | Lindley ................ F16K 31/20 |
| | | 137/390 |

(Continued)

FOREIGN PATENT DOCUMENTS

| CH | 390796 A * | 4/1965 | ............ F16K 31/24 |
| CH | 406073 A * | 1/1966 | ............ B67D 7/365 |

(Continued)

*Primary Examiner* — Reinaldo Sanchez-Medina
*Assistant Examiner* — Hailey K. Do
(74) *Attorney, Agent, or Firm* — Merek, Blackmon & Voorhees, LLC

(57) ABSTRACT

A testable overfill prevention valve ("TOPV") for a liquid storage container. The TOPV allows an individual to readily verify the operability of the TOPV. Preferably, a test member of directly contacts a portion of a latch to release a flow control member so that the flow control member can move from an open position to a closed position wherein in the closed position liquid is generally prevented from flowing out the TOPV. The test member preferably directly contacts the flow control member to move the control member to an intermediate position between open and closed positions allowing an individual looking down into the TOPV to see that the flow control member has moved sufficiently to confirm operability of the TOPV. Preferably, the test member is spring biased to a non-testing position and the entire test member is disposed in the housing of the TOPV when in a testing position.

22 Claims, 13 Drawing Sheets

(51) Int. Cl.
*F16K 31/20* (2006.01)
*F16K 17/04* (2006.01)
*B65D 90/26* (2006.01)
*F16K 31/24* (2006.01)
*B67D 7/32* (2010.01)

(52) U.S. Cl.
CPC ........ *B67D 7/3218* (2013.01); *F16K 17/0466* (2013.01); *F16K 31/20* (2013.01); *F16K 31/24* (2013.01)

(58) Field of Classification Search
CPC ........ F16K 31/46; F16K 31/52; F16K 31/521; B67D 7/365; B67D 7/3218; B67D 7/3227
See application file for complete search history.

(56) References Cited

U.S. PATENT DOCUMENTS

| | | | |
|---|---|---|---|
| 2,299,360 A | 10/1942 | Tharp | |
| 4,770,317 A | 9/1988 | Podgers et al. | |
| 5,027,870 A | 7/1991 | Butterfield | |
| 5,485,866 A | 1/1996 | Bowen | |
| 5,518,024 A | 5/1996 | Weeks | |
| 5,622,205 A * | 4/1997 | Petersen | F16K 15/181 137/242 |
| 6,499,518 B2 | 12/2002 | Clemmons et al. | |
| 7,089,974 B2 | 8/2006 | Stuart | |
| 8,281,823 B2 | 10/2012 | Mitrovich et al. | |
| 8,517,045 B2 | 8/2013 | Barnham | |
| 9,463,971 B2 | 10/2016 | Higgins et al. | |
| 2004/0050424 A1 | 3/2004 | Sosa | |
| 2008/0216900 A1 | 9/2008 | Barnham | |
| 2013/0213480 A1 | 8/2013 | Higgins et al. | |
| 2015/0192220 A1 | 7/2015 | Kuehn et al. | |
| 2016/0370811 A1 | 12/2016 | Higgins et al. | |

FOREIGN PATENT DOCUMENTS

| | | | |
|---|---|---|---|
| DE | 1221982 B * | 7/1966 | ............. F16K 31/24 |
| DE | 1231167 | 12/1966 | |
| EP | 3124431 | 2/2017 | |
| FR | 1275314 | 11/1960 | |
| GB | 2380992 | 4/2003 | |

* cited by examiner

TESTABLE OVERFILL PREVENTION VALVE FOR A LIQUID STORAGE CONTAINER

FIELD OF THE INVENTION

A preferred form of the present invention is directed to devices for preventing overfilling of liquid storage tanks including but not limited to liquid storage tanks installed underground and commonly used for storing gasoline and other fuel products. In one form, these overfill prevention devices take the form of a testable overfill prevention valve that allows an individual to test the operability of the overfill prevention valve when the overfill prevention valve is installed in an operating position in a liquid storage tank.

BACKGROUND OF THE INVENTION

Storage tanks for storing gasoline and other fuels at service stations are typically but not always buried in the ground. When buried, manholes having removable covers positioned at or adjacent ground level provide access to buried storage tanks as well as components connected to buried storage tanks. Manholes typically house fill pipes that are connected to the interior of the storage tanks. Storage tanks are typically serviced by tanker trucks which have hoses that connect to a fitting mounted on or about a fill pipe housed in the manhole.

The fuel level in buried storage tanks is typically monitored by the insertion of a measuring stick or graduated pole through the fill pipe into the storage tank to the bottom thereof. Upon withdrawal of the measuring stick, the wet area of the stick will indicate the level of fuel in the storage tank.

Overfilling of storage tanks with gasoline or similar fuels causes spillage of such fuels onto the ground which results in soil and air contamination and possibly other detrimental ecological consequences. It has been previously proposed to provide devices for preventing the flow of fuel into storage tanks when the storage tanks are filled to a preselected level of its maximum capacity. One such device is the overfill prevention valve disclosed in U.S. Pat. No. 5,518,024 the entire contents of which are incorporated herein by reference. However, for purposes of interpreting the meaning of the claims of the subject invention, the subject Specification without reference to U.S. Pat. No. 5,518,024 is to be used to ascertain the meaning of the claims.

In order to prevent tampering and/or damage from accidental impacts or the like, overfill prevention valves are preferably located entirely within the liquid storage tank.

Overfill prevention valves typically include a flow control member having a closure element which moves from an open position to a closed position to control flow of fuel into the liquid storage tanks. When in the closed position, the flow control member generally prevents fuel from escaping out an outlet of the overfill prevention valve, i.e., no significant amount of fuel escapes out the outlet. When in an open position, the flow control member allows fuel to flow through the outlet of the overfill prevention valve and enter the liquid storage tank through a portion of piping connected to the lower end of the overfill prevention valve.

Devices have previously been provided for testing the operability of the overfill prevention valve to verify that the overfill prevention valve will properly control the flow of fuel into the liquid storage container. However, these previously developed devices suffer from numerous deficiencies which will be readily apparent to one of ordinary skill in the art when a comparison is made between the subject invention and previously known devices.

OBJECTS AND SUMMARY OF THE INVENTION

An object of the present invention is to provide a novel and unobvious testable overfill prevention valve.

Another object of a preferred embodiment of the present invention is to provide a testable overfill prevention valve having a test member for testing the operability of the overfill prevention valve where the test member is entirely or substantially entirely disposed in a housing of the overfill prevention valve when in a non-testing position and when in a testing position.

A further object of a preferred embodiment of the present invention is to provide a testable overfill prevention valve having a test member for testing the operability of the overfill prevention valve where the test member is spring biased in a non-testing position.

Yet another object of a preferred embodiment of the present invention is to provide a testable overfill prevention valve having a test member for testing the operability of the overfill prevention valve that includes at least one actuator that moves downwardly in a liquid flow passageway of the overfill prevention valve and directly contacts a portion of a flow control member controlling the flow of liquid through the overfill prevention valve during a test of the operability of the flow control member of the overfill prevention valve.

Still a further object of a preferred embodiment of the present invention is to provide a testable overfill prevention valve having a test member for testing the operability of the overfill prevention valve that includes at least first and second actuators wherein the first actuator directly contacts a portion of a latch to allow a valve closure member to move from an open position toward a closed position and the second actuator directly contacts the valve closure member to move the valve closure member to an intermediate position between the open position and the closed position during a test of the operability of the flow control member of the overfill prevention valve allowing an individual looking downwardly into the overfill prevention valve to confirm/verify the operability of the flow control member.

Still another object of a preferred embodiment of the present invention is to provide a testable overfill prevention valve having a test member for testing the operability of the overfill prevention valve that includes a first spring biasing the test member in a non-testing position and a second spring biasing an actuator into an operating position in which the actuator directly contacts and moves a portion of a latch to allow a closure member of a flow control member to move from an open position to a closed position wherein the first spring and the second spring are disposed entirely within a housing of the overfill prevention valve.

Yet still another object of a preferred embodiment of the present invention is to provide a testable overfill prevention valve having a test member for testing the operability of the overfill prevention valve that includes a first spring biasing the test member in a non-testing position and a second spring biasing an actuator into an operating position in which the actuator directly contacts and moves a portion of a latch to allow a closure member of a flow control member to move from an open position towards a closed position and wherein a first portion of the test member maintains the second spring in a compressed state when the test member is in a non-testing position and wherein when a second portion of the test member is depressed a predetermined distance, the first portion is moved to a position where the second spring biases the actuator to directly contact and move a portion of the latch to allow the closure member to move from the open position towards the closed position.

Yet still a further object of a preferred embodiment of the present invention is to provide a testable overfill prevention valve having a test member for testing the operability of the overfill prevention valve that includes one or more alignment members configured to maintain proper positioning/alignment of the test member when the test member is moved from a non-testing position to a testing position and/or when the test member is moved from a testing position to a non-testing position.

A further object of a preferred embodiment of the present invention is to provide a testable overfill prevention valve having a test member for testing the operability of the overfill prevention valve wherein the test member moves downwardly to test the operability of the overfill prevention valve and no portion of the test member extends below a closure member wherein the closure member moves from an open position to a closed position to seal or substantially seal the overfill prevention valve to prevent any significant amount of liquid from escaping through an outlet of the overfill prevention valve.

Yet a further object of a preferred embodiment of the present invention is to provide a testable overfill prevention valve having a test member for testing the operability of the overfill prevention valve which does not use a magnet to test the operability of the overfill prevention valve.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an overfill prevention valve for a liquid storage tank. The overfill prevention valve includes a housing having a liquid inlet, a liquid outlet and a liquid flow passageway extending through the housing. The liquid flow passageway is configured to deliver a liquid to the liquid storage tank. The liquid inlet of the housing is positioned above the liquid outlet when the overfill prevention valve is in an operating position. A moveable closure member is disposed in the liquid flow passageway. The moveable closure member is moveable between a first position in which liquid is free to flow out the liquid outlet and a second position in which liquid is generally prevented from passing through the liquid outlet. A float is operably associated with the moveable closure member. The float is configured to allow the moveable closure member to move from the first position to the second position when liquid in the liquid storage tank has reached a predetermined level. A testing member is provided for testing operability of the moveable closure member wherein a portion of the testing member contacts the moveable closure member during a test to test the operability of the moveable closure member. A biasing member is connected to the testing member for biasing the testing member to a non-testing position in which the moveable closure member permits a liquid to flow through the liquid outlet of the housing. The biasing member is disposed in the liquid flow passageway.

Another preferred embodiment of the present invention is directed to an overfill prevention valve for a liquid storage tank. The overfill prevention valve includes a housing having a liquid inlet, a liquid outlet and a liquid flow passageway extending through the housing from the liquid inlet to the liquid outlet. A closure member is provided for preventing flow of liquid out the liquid outlet. The closure member is positioned between the liquid inlet and the liquid outlet. A float is operably associated with the closure member. The float is configured to allow the closure member to move from an open position in which a liquid flows through the housing to the liquid storage tank to a closed position generally preventing a liquid from passing through the liquid outlet of the housing. A testing member is provided for testing operability of the closure member. The testing member is disposed entirely within the liquid flow passageway of the housing when the testing member is in a testing position and wherein in the testing position at least a portion of the closure member is visible to an individual.

A further preferred embodiment of the present invention is directed to an overfill prevention valve for a liquid storage tank. The overfill prevention valve includes a housing having a liquid inlet, a liquid outlet and a liquid flow passageway extending through the housing from the liquid inlet to the liquid outlet. A closure member is provided for preventing flow of liquid out the liquid outlet. The closure member is positioned between the liquid inlet and the liquid outlet. A float is operably associated with the closure member. The float is configured to allow the closure member to move from an open position in which a liquid flows through the housing to the liquid storage tank to a closed position generally preventing a liquid from passing through the liquid outlet of the housing. A testing member is provided for testing operability of the closure member. The testing member is configured such that when a user depresses the testing member, the testing member engages the closure member to move the closure member from the open position towards the closed position and wherein at least a portion of the testing member is disposed in the liquid flow passageway of the housing when the testing member is in a non-testing position and a testing position.

Still a further preferred embodiment of the present invention is directed to an overfill prevention valve for a fuel storage tank. The overfill prevention valve includes a housing having a fuel inlet, a fuel outlet and a fuel flow passageway extending through the housing. The fuel flow passageway is configured to deliver fuel to the fuel storage tank. The fuel inlet is positioned above the fuel outlet when the overfill prevention valve is in an operating position. A moveable closure member is disposed in the fuel flow passageway. The moveable closure member is moveable between a first position in which fuel is free to flow out the fuel outlet and a second position in which fuel is generally prevented from passing through the fuel outlet. The moveable closure member includes a flapper moveable between the first position and the second position and a latch. The latch includes a moveable latch member which when engaged with a portion of the flapper holds the flapper in the first position. The latch further includes a moveable catch member which when in a latched position maintains the flapper in the first position. A float is operably associated with the moveable closure member. The float is configured to move the moveable catch member from the latched position to an unlatched position to allow the flapper of the moveable closure member to move from the first position towards the second position when fuel in a fuel liquid storage tank has reached a predetermined level. A testing member is provided for testing operability of the moveable closure member. The testing member includes a first actuator and a second actuator. The first actuator is configured to engage the moveable catch member and move the moveable catch member from the latched position to the unlatched position to allow the flapper of the moveable closure member to move from the first position towards the second position. The second actuator is configured to engage and move the flapper from the first position to a third position, wherein the third position is a position between the first position and the second position and wherein an individual can see at least a portion of the flapper when the flapper is in the third position to confirm operability of the moveable closure member.

The above summary describes preferred forms of the present invention and is not in any way to be construed as limiting the claimed inventions to the preferred forms.

DETAILED DESCRIPTION OF THE PREFERRED EMBODIMENTS OF THE INVENTION

The preferred forms of the present invention will now be described with reference to FIGS. 2-14. The appended claims are not limited to the preferred forms and no term and/or phrase used herein is to be given a meaning other than its ordinary meaning unless it is expressly stated otherwise.

FIG. 1

Figure 1:
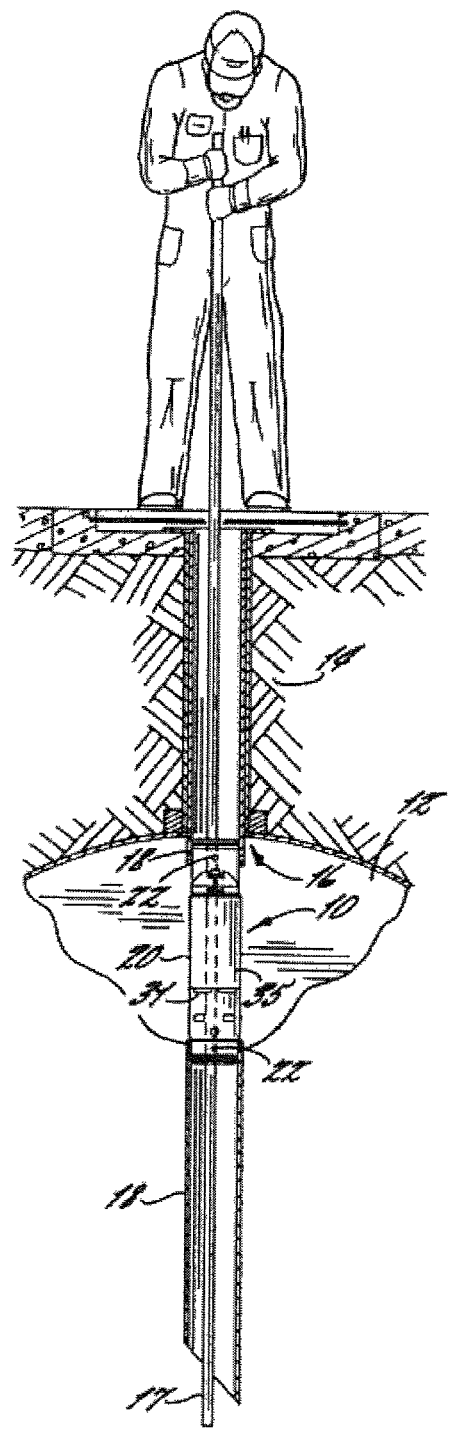
FIG. 1 is an elevation view of a portion of an underground fuel storage tank and associated components with an individual extending a fuel level measuring member inserted through an overfill prevention valve and into the storage area of the underground fuel storage tank.

FIG. 1 depicts a conventional orientation of an overfill prevention valve in an operating position in an underground fuel storage tank. Overfill prevention valve 10 depicted in FIG. 1 is of the type disclosed in U.S. Pat. No. 5,518,024. Overfill prevention valve 10 is located within the upper portion of tank 12, which may be an underground tank such as is commonly used by gasoline service stations for storage of gasoline and similar liquids. Such a tank customarily and illustratively has a fill pipe 14 extending upwardly from an inlet opening 16 of tank 12.

A first portion of a removable drop tube 18 is connected to a lower end of the fill pipe 14 at one end and is connected to an upper end of valve 10 at the other end. A second portion of the drop tube 18 is connected at one end to a lower end of the overfill prevention valve 10 and the other end of the second portion terminates adjacent the bottom of the tank 12.

Gasoline or other fuel or liquid would normally be introduced into the tank 12 to initially fill or refill the tank 12, by a tanker truck having a flexible conduit communicating via a suitable coupling or fitting associated with the fill pipe 14 and the drop tube 18.

Overfill prevention valve 10 disposed in tank 12 is connected in series with the first and second portions of the drop tube 18 at a predetermined elevation within the tank 12. The operating elevation of the overfill prevention valve is dependent upon the maximum height which the liquid level within the tank is to reach during each filling operation. The housing 20 of the overfill prevention valve 10 has a diameter approximately the same as that of the first and second portions of the drop tube 18, and is secured to and in axial alignment with the first and second portions of the drop tube 18 by rivets 22 or any other suitable fastener.

Referring again to FIG. 1, an individual is shown holding a fuel measuring pole/stick inserted into the tank 12 to determine the level of liquid in storage tank 12.

FIGS. 2-14

The preferred overfill prevention valve A illustrated in FIGS. 2 through 14 may be oriented in a similar manner or the same manner as the overfill prevention valve 10 of FIG. 1. Alternatively, overfill prevention valve A may be oriented in any other suitable manner. Further, overfill prevention valve A of the subject invention is not limited to use in underground storage tanks or storage tanks storing gasoline or other fuel. Rather, overfill prevention valve A can be used with any suitable liquid storage tank positioned above or below ground regardless of the liquid stored in the storage tank.

Referring to FIGS. 2-14, overfill prevention valve A includes an elongated tubular housing 30 having an open liquid inlet 32, an open liquid outlet 34 and a liquid flow passageway 36 extending from liquid inlet 32 to liquid outlet 34 so that a liquid can pass through the overfill prevention valve A. The housing 30 may have a cylindrical shape or any other suitable shape. Housing 30 preferably has a diameter approximately the same size as the diameters of the corresponding portions (e.g., upper and lower portions) of a drop tube, and is secured to and in axial alignment with corresponding portions the drop tube by rivets or any other suitable fastening device.

Liquid flow passageway 36 extends completely through housing 30 and liquid inlet 32 communicates with the outlet of the upper portion the drop tube and liquid outlet 34 communicates with inlet of the lower portion of the drop tube. Overfill prevention valve A can be connected to the upper and lower portions of the drop in the manner illustrated in FIG. 1. Housing 30 may include one or more deflector/diverter fins or members 38 in an upper half of housing 30 for the reasons stated in U.S. Pat. No. 5,518,024.

Overfill prevention valve A includes a main flow control member B and a lower float C operably associated (i.e., the main flow control member B operates in conjunction with lower float C) with the main flow control member B. Overfill prevention valve A may also include a secondary flow control member D and an upper float E operably associated (i.e., the secondary flow control member D operates in conjunction with upper float E) with the secondary flow control member D. It should be noted that secondary flow control member D and an upper float E may be omitted.

Floats C and E are slidably mounted in chamber G formed between an exterior of housing 30 and removable plate 41 held by screws to housing 30. Plate 41 is configured such that when attached to housing 30 one or more openings are formed to allow liquid from the tank to enter chamber G and raise floats C and E when the liquid level in the tank has reached a sufficient level to move each float. Floats C and E are preferably open at the lower ends thereof.

Overfill prevention valve A further includes a testing member F allowing an individual to test/confirm the operability of main flow control member B while overfill prevention valve A is installed in an operating position in the liquid storage tank and the level of liquid in the liquid storage tank has not reached a level which will cause lower float C to trigger the release of a latch holding main flow control member B in an open position.

Preferably, testing member F is entirely housed within housing 30 of overfill prevention valve A when testing member is in a testing position, i.e., a position that allows an individual to confirm the operability of main flow control member B so that no portion of testing member F extends above the liquid inlet 32 and no portion of testing member F extends below liquid outlet 34. Similarly, testing member F is preferably entirely of substantially entirely disposed within housing 30 of overfill prevention valve A when testing member is in a non-testing position, i.e., testing member F has not been activated. "Substantially entirely" as used herein means that at least 90% by volume of testing member F is disposed in housing 30.

Main flow control member B and secondary flow control member D are, respectively, located adjacent the lower end portion and the upper end portion of liquid flow passageway 36 in the preferred embodiment, but may be combined in a single assembly at a predetermined position in liquid flow passageway 36. Main flow control member B controls liquid flow out liquid outlet 34 while secondary flow control member D controls flow of liquid out opening 40 in an upper portion of housing 30.

Figure 2:
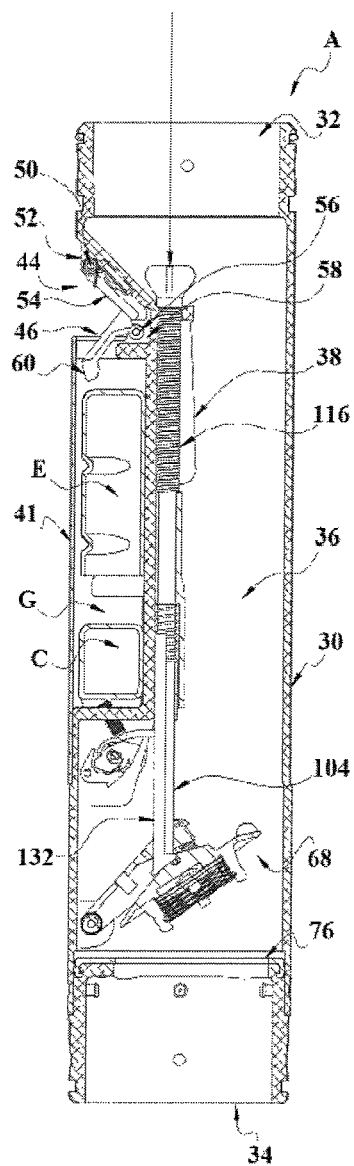
FIG. 2 is a sectional view of one preferred form of overfill prevention valve with a testing member in a testing position.
Figure 3:
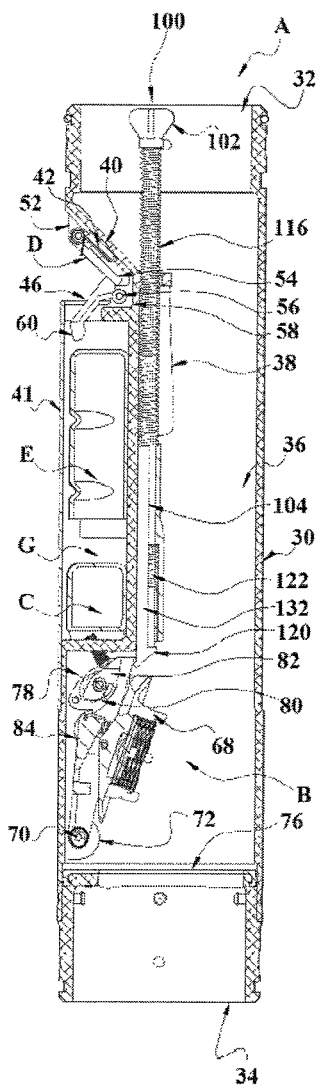
FIG. 3 is a sectional view of the overfill prevention valve of FIG. 2 with the testing member in a non-testing position.

Secondary flow control member D includes a closure member 42, linkage portion/segment 44 and linkage portion/segment 46. Linkage segment 44 includes a spring 48 mounted on a rotatable shaft 50. Shaft 50 extends through openings formed in each of two opposing and spaced tabs 52 (only one of which is shown in FIGS. 2 and 3) formed on an exterior of housing 30. Tabs 52 rotatably mount shaft 50 to housing 30. Each end of shaft 50 has an enlarged head larger than the size of each of the openings in tabs 52 to prevent the shaft 50 from becoming dislodged from tabs 52. A support arm 54 is fixed to shaft 50 so that arm 54 rotates with but not relative to shaft 50.

Spring 48 biases support arm 54 to a position where support arm 54 holds closure 42 in sealed engagement with opening 40 to seal opening 40. A first end of spring 48 engages an exterior of housing 30 and a second end of spring 48 engages arm 54. Once liquid pressure in liquid flow passageway 36 has reached a level to overcome the force of spring 48, shaft 50 and support arm 54 rotate clockwise allowing closure member 42 to move outwardly away from opening 40 to allow liquid to escape into the tank through opening 40.

Linkage segment 46 includes a shaft 56 extending through an opening formed in each of two opposing and spaced tabs 58 (only one of which is shown in FIGS. 2 and 3) formed on an exterior of housing 30. Each end of shaft 56 has an enlarged head larger than the size of each of the openings in tabs 58 to prevent shaft 56 from becoming dislodged from tabs 58. A support arm 60 is fixed to a cylindrical collar 62. Collar 62 is rotatably mounted on shaft 56 between tabs 58 so that arm 60 rotates with but not relative to collar 60. As the level of liquid in the tank rises, the liquid will at some point be sufficiently high to raise upper float E to a position causing support arm 60 and shaft 56 rotate clockwise to a point where an upper end of support arm 60 engages a lower portion of support arm 54 to prevent support arm 54 and shaft 50 from rotating thereby sealing opening 40.

All components of secondary flow control member D as described above can take the form disclosed in U.S. Pat. No. 5,518,024. However, secondary flow control member D can take many other forms and can be omitted in its entirety.

Main flow control member B includes a closure member 68 rotatably mounted on shaft 70. (see e.g., FIGS. 5 and 8). Shaft 70 is mounted adjacent an internal wall of liquid flow passageway 36 by two opposing and spaced inwardly extending projections 72 of housing 30. Control member B further includes a spring 74 (see FIG. 4) mounted on shaft 70 and engaging a portion of closure member 68 for biasing closure member 68 to an open/latched position in which liquid is free to flow through outlet 34.

Control member B further includes a seat member 76 (see e.g., FIG. 8) configured to receive closure member 68 to form a seal. When the closure member 68 is seated on seat member 76, liquid is generally prevented from flowing out outlet 34 of overfill prevention valve A. When seated in seat member 76, closure member 68 extends horizontally across liquid flow passage 36. Closure member 68 can be a flapper or any other suitable sealing or closure element.

Figure 12:
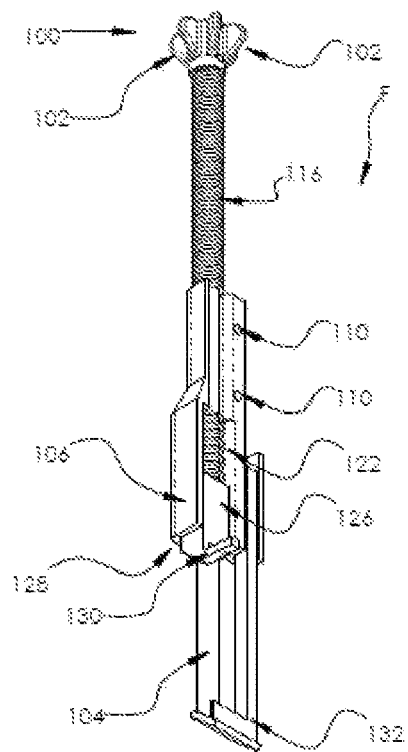
FIG. 12 is an elevation view of the testing member of FIG. 2 removed from the overfill prevention valve with the upper spring in a compressed state and the lower spring in an expanded state.
Figure 13:
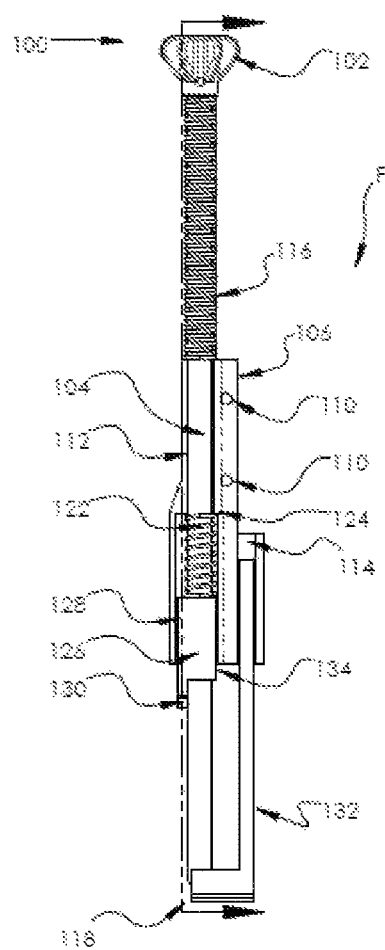
FIG. 13 is an elevation view of the testing member of FIG. 12 rotated slightly from the orientation of FIG. 12.

Main flow control member B further includes a latch 78 which holds closure member 68 in an open or latched position an example of which is shown in FIG. 3. Latch 78 includes a pivotable latch member 80 and a pivotable catch member 82. Latch member 80 acts with pivotable member 84 pivotally mounted on closure member 68 to maintain closure member 68 in an open/latched position preventing closure member 68 from moving from the open/latched position until latch 78 is tripped or triggered. In a latched position, latch member 80 has a shoulder engaged with a shoulder of member 84. An enlargement of this connection is shown in FIG. 12 of U.S. Pat. No. 5,518,024 wherein the latch member is referred to by reference numeral 66 and the member corresponding to pivotable member 84 is referred to by reference numeral 25. Members 80, 82 and 84 are mounted on a shaft, i.e., three shafts with each shaft having one of members 80, 82 and 84 pivotally mounted thereon.

Figure 8:
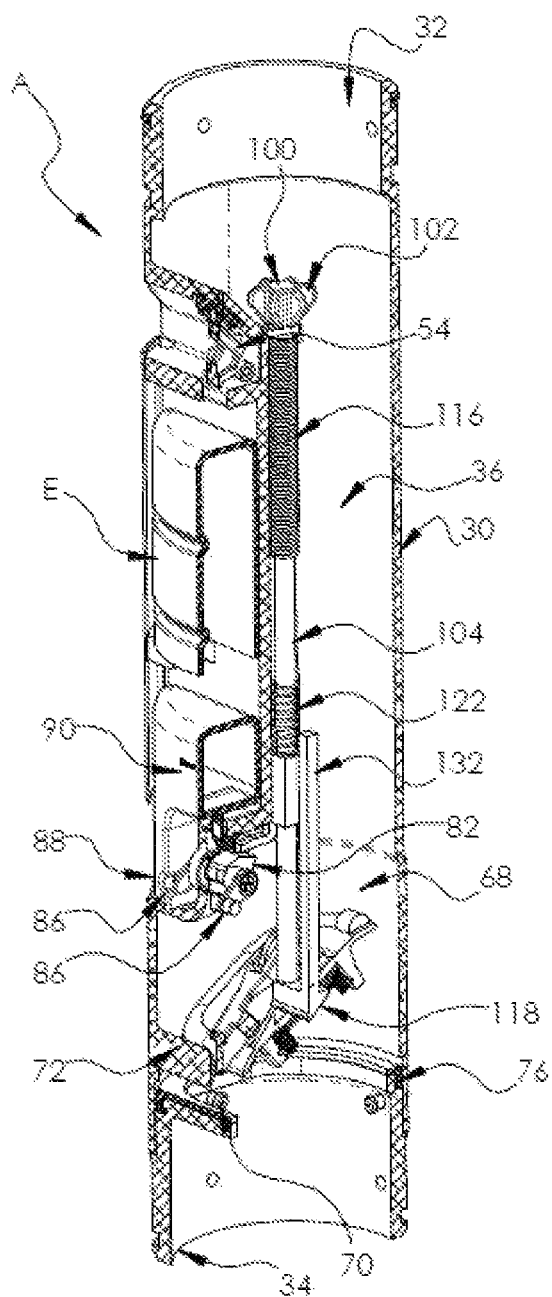
FIG. 8 is a fragmentary perspective view of the overfill prevention valve of FIG. 2 with the testing member in a testing position.
Figure 9:
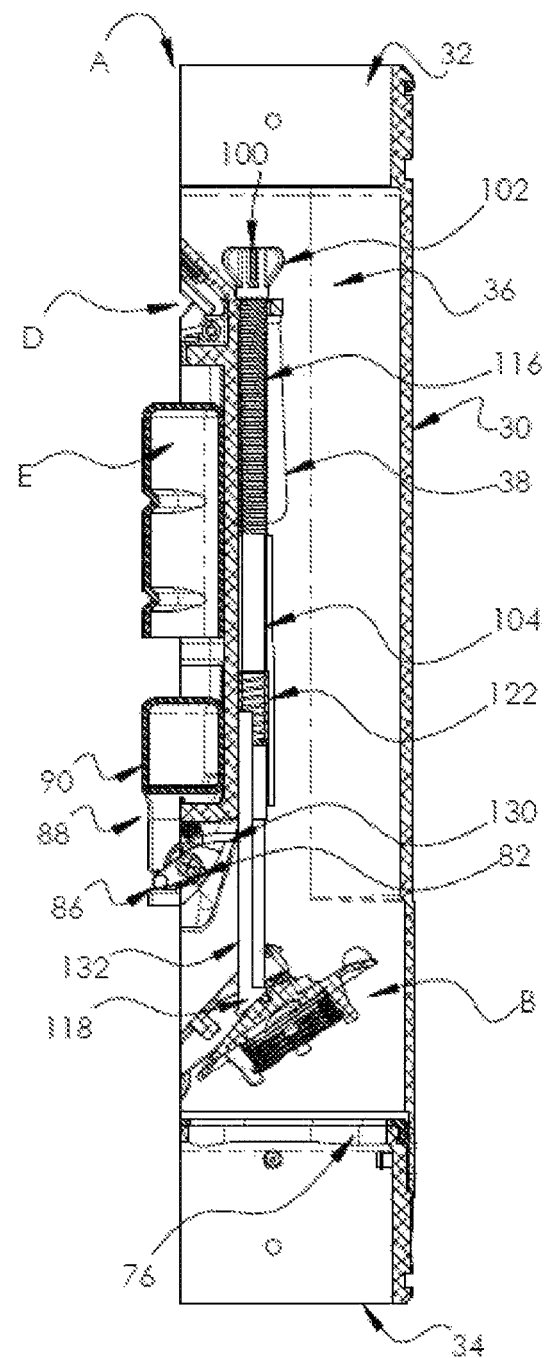
FIG. 9 is a sectional view of the overfill prevention valve of FIG. 2 with the testing member in a testing position showing additional details including the linkage for the lower float.
Figure 10:
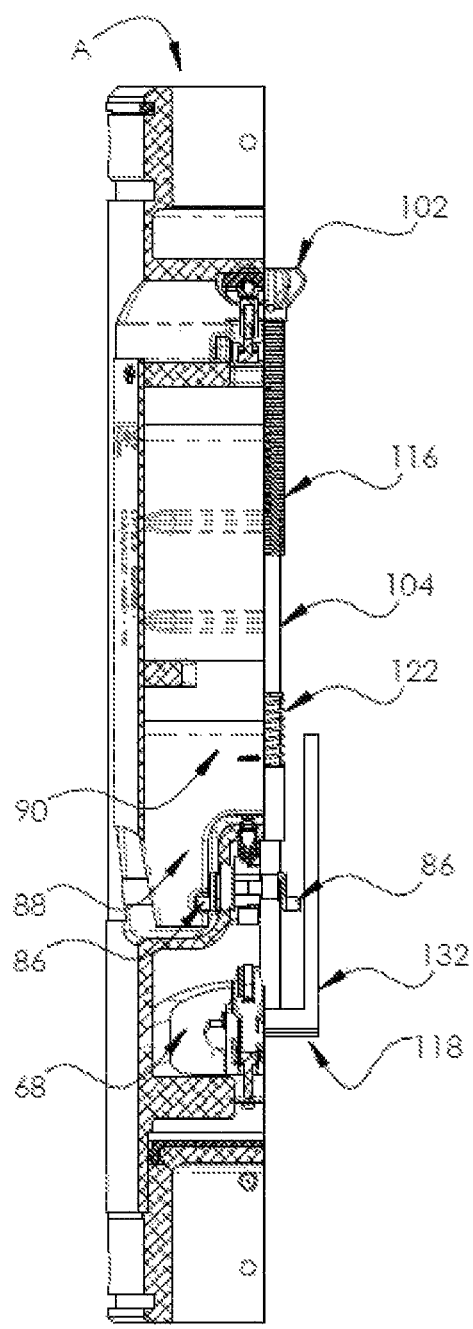
FIG. 10 is a sectional view of the overfill prevention valve of FIG. 2 with the testing member in a testing position and some components of the overfill prevention valve omitted so that other components are readily visible.
Figure 11:
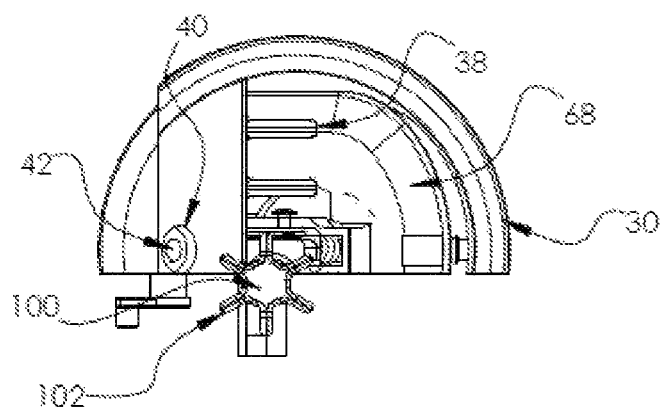
FIG. 11 is a fragmentary top view of the overfill prevention valve of FIG. 2 with the testing member in a testing position and some components of the overfill prevention valve omitted so that other components are readily visible.

Catch member 82, as seen in FIG. 8, includes a pair of opposing and spaced legs 86 that seat in corresponding depressions formed in opposing and spaced lower leg float portions 88 (only one of which is shown in FIG. 8) which extend downwardly from body 90 of lower float C. Each of lower leg float portions 88 are preferably open at their bottom end. When liquid enters lower float C through the openings formed in the bottom end of leg portions 88, the float C will rise with the rising liquid causing legs 86 of member 82 to move with the float C causing member 82 to pivot upwardly thereby allowing latch member 80 to pivot triggering/tripping latch member 80 to free closure member 68 to move toward a closed position. The pressure of liquid passing downwardly in liquid flow passageway will cause closure member to seat on seat member 76.

All components of main flow control member B as described above can take the form disclosed in U.S. Pat. No. 5,518,024. However, the components of main flow control member B can take many other forms including those commonly used in other types of existing overfill prevention valves.

Testing member F for testing the operability of overfill prevention valve A will now be described in detail. Referring to FIGS. 2 to 14, testing member F, in its most preferred form, includes a test head 100 which forms an uppermost portion of the testing member F. Test head 100 includes a plurality of outwardly extending fins or ribs 102 spaced along the circumference of test head 100. The spacing of ribs 102 allows liquid to readily flow through the space formed between adjacent fins or ribs 102 while increasing the upper surface area of test head 100 to readily allow an individual to apply a downward force on test head 100 utilizing any suitable tool (e.g., stick, pole, rod, etc.) to perform a test. As readily seen in FIGS. 2 and 3, the tool need only extend into a minor portion of housing 30 to perform a test.

A shaft 104 is removably attached to a lower portion of test head 100. This attachment could be achieved through a threaded connection or be achieved using any other suitable fastening means. A body 106 is attached to an inner wall of housing 30 using any suitable means. For example, rivets or pins 108 (see, e.g., FIG. 4) can be used to secure body 106 to housing 30 using openings 110 in body 106. Body 106 does not move relative to housing 30.

Body 106 and the adjacent portion of the inner wall of housing 30 form two separate and distinct longitudinally extending hollow cavities 112 and 114. A spring 116 is mounted on shaft 104. An upper end of spring 116 engages/abuts a lower end of test head 100 and a lower end of spring 116 engages/abuts an upper end of body 106. Spring 116 acts to bias the moveable components of testing member F upwardly to assume a non-testing position shown in FIG. 3. Shaft 104 extends through hollow cavity 112 and is fixed at its lower end to lower actuator 118.

Figure 14:
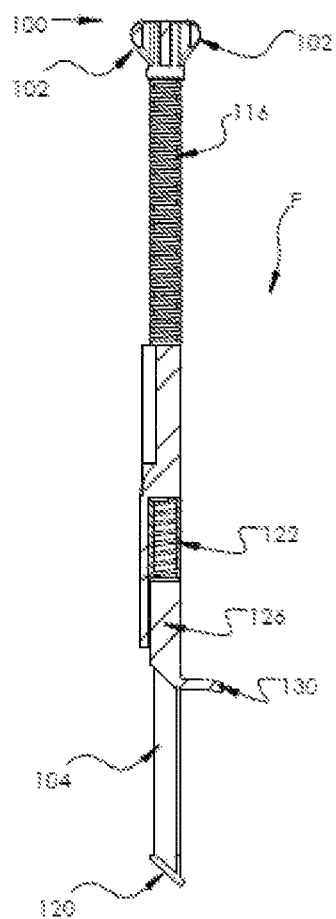
FIG. 14 is a sectional view of the testing member of FIG. 12 taken along the line indicated in FIG. 13 by the upper and lower enlarged arrows.

As seen in FIG. 14, actuator 118 includes an inclined actuator surface 120. Actuator surface 120 forms an acute angle with a longitudinal axis extending through a center of housing 30. As is readily evident from, for example FIG. 2, the portion of actuator surface 120 closest to an inner wall of housing 30 is disposed below a portion of actuator surface 120 furthest from the inner wall of housing 30. Because actuator 118 is fixed to shaft 104, actuator 118 moves with but not relative to shaft 104.

Spring 122 is mounted on shaft 104 in hollow cavity 112. An upper end of spring 122 abuts an inner wall 124 of hollow cavity 112. The lower end of spring 122 abuts an uppermost surface of body 126 of actuator 128. Body 126 can have a shape that mimics the cross-sectional shape of hollow cavity 112. Body 126 includes a hollow cavity extending therethrough. Shaft 104 is free to slide through the hollow cavity formed in body 126 to allow shaft 104 to move relative to body 126. Actuator 128 includes a trigger fin, tab or member 130. Spring 122 acts to bias actuator 128 in the position shown in FIG. 13.

Actuator 128 includes an alignment member 132 slidably disposed in hollow cavity 114. Alignment member 132 can have a shape that mimics the cross-sectional shape of hollow cavity 114. Alignment member 132 ensures proper alignment of the components of testing member F when moved between a non-testing position and a testing position. It should be noted that while actuator 128 and alignment member are shown as a single piece, actuator 128 and alignment member 132 could be separate pieces with a lower end of alignment member 132 fixed to actuator 128.

Figure 4:
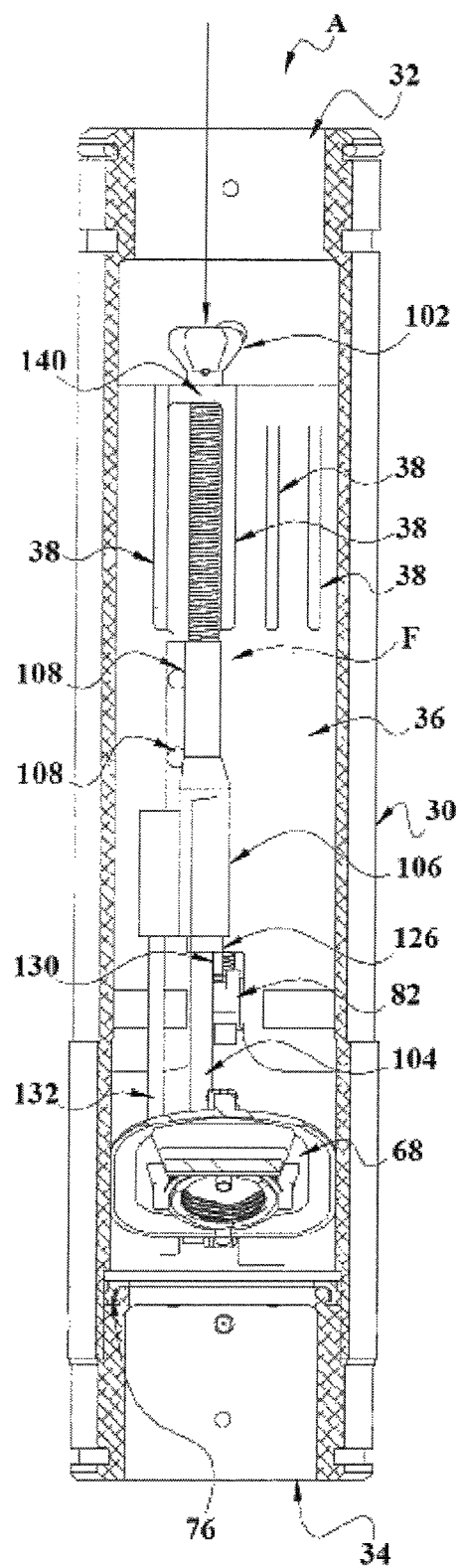
FIG. 4 is a sectional view of the overfill prevention valve of FIG. 2 with the testing member in a testing position, this sectional view being taken from a vantage point rotated ninety degrees from the vantage point of the sectional view of FIG. 2.
Figure 5:
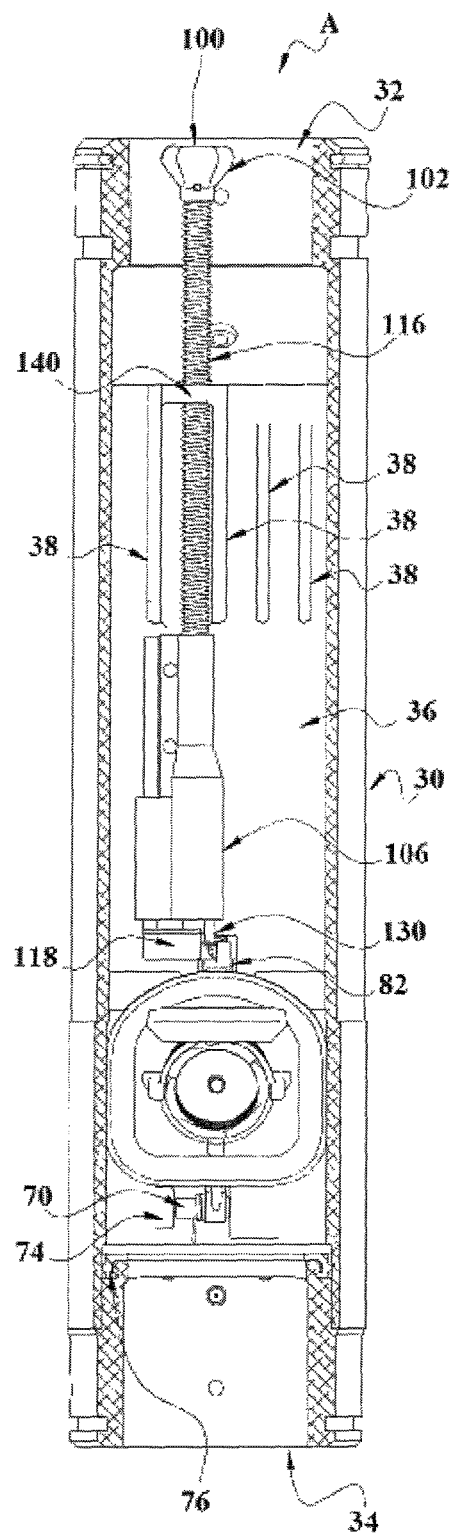
FIG. 5 is a sectional view of the overfill prevention valve of FIG. 2 taken from the same vantage point as FIG. 4 with the testing member in a non-testing position.
Figure 6:
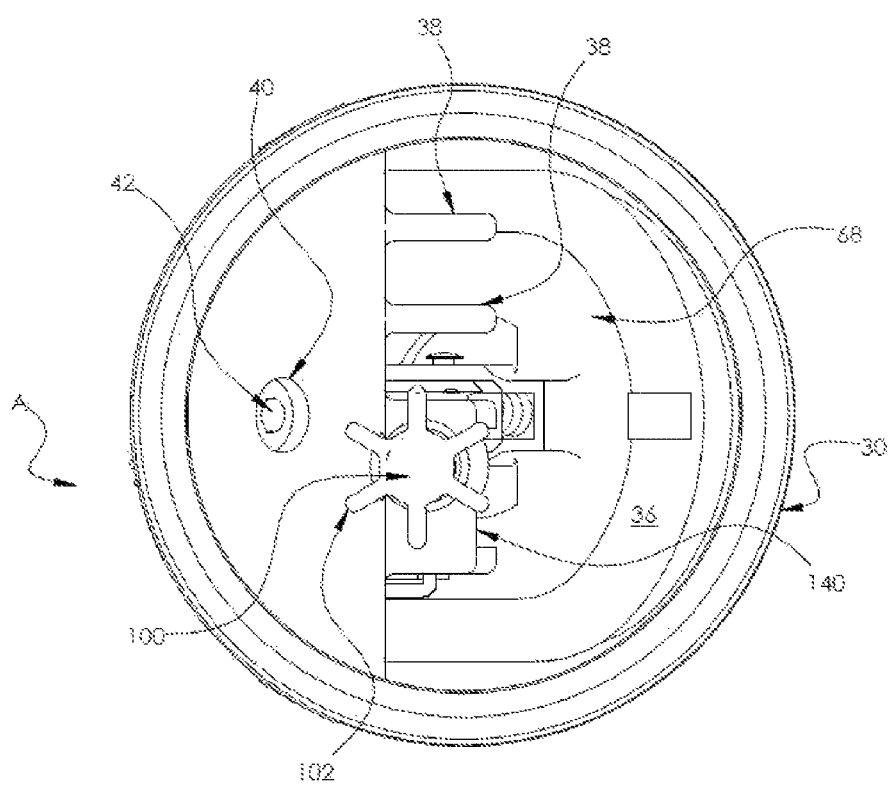
FIG. 6 is a top view of the overfill prevention valve of FIG. 2 with the testing member in a testing position and the flapper moved partially toward the closed position where the flapper is clearly visible to an individual looking down into the overfill prevention valve.
Figure 7:
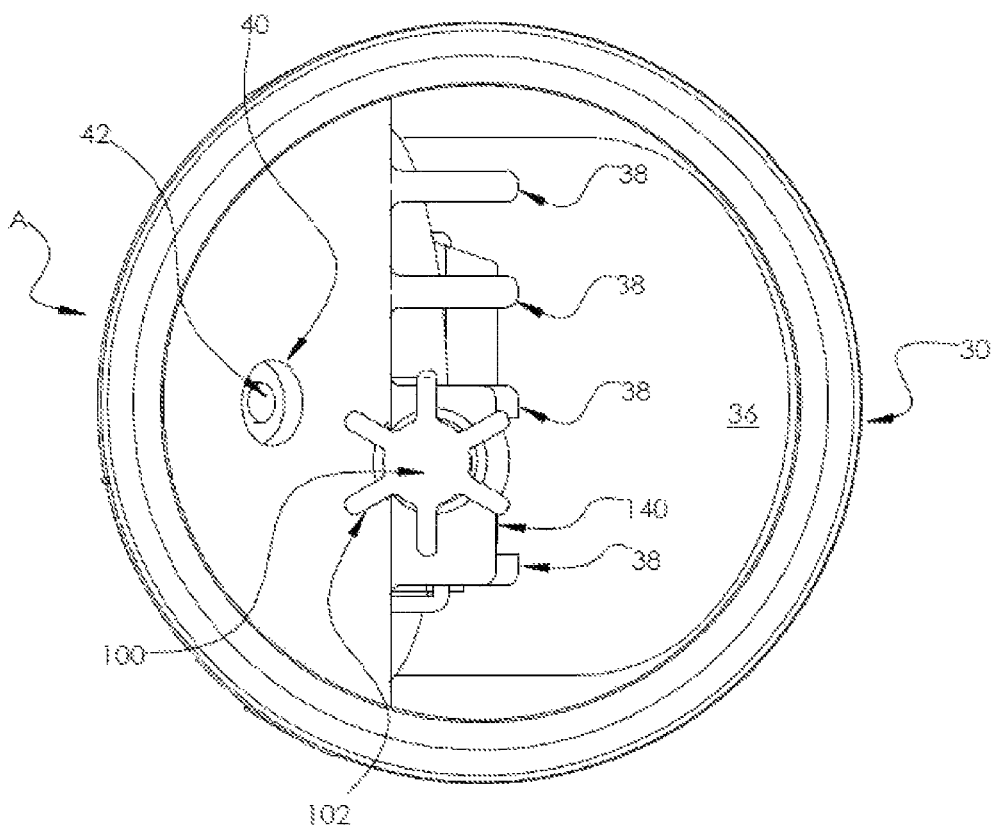
FIG. 7 is a top view of the overfill prevention valve of FIG. 2 with the testing member in a non-testing position and the flapper latched in an open position.

Referring to FIG. 4, a wall member 140 extends between and is fixed to adjacent deflectors/diverters 38. Wall member 140 includes an opening allowing shaft 104 to slide through wall member 140 when shaft 104 is moved between a testing position and a non-testing position. Wall member 140 acts to ensure proper alignment of an upper portion of shaft 104 when shaft 104 is moved between a non-testing position and a testing position.

The operation of testing member F will now be described. When no pressure is applied to test head 100, the components of testing member assume the non-testing position shown in FIG. 3. In the non-testing position, actuator 118 contacts surface 134 of body 126 and compresses spring 122 so that body 126 slides upwardly into hollow cavity 112 and finger 130 is disposed adjacent a lower surface of body 106.

When a test is performed, an individual inserts a rod, stick or other member to apply a downward force on test head 100 which in turn moves shaft 104 and actuator 118 downwardly to a position that allows spring 122 to force body 126 and finger 130 downwardly to a position where finger 130 engages and pivots catch member 82 sufficiently to allow latch member 80 to pivot to a position which frees closure member 68. This is readily evident when comparing FIG. 3, in which testing member F is in a non-testing position, and FIG. 2, in which the testing member F is in a testing position.

In the non-testing position, finger 130 is disposed above and out of contact with catch member 82. In FIG. 3, finger 130 has moved downwardly to a position in which finger 103 has engaged and pivoted catch member 82 to an unlatched position releasing closure member 68. Finger 130 causes the same type of movement of the components of latch 80 as described above when float C rises due to the rising level of liquid in the storage tank to release the closure member 68.

When test head 100 is sufficiently depressed, actuator surface 120 of actuator 118 directly contacts closure member 68 and moves closure member 68 to the position shown in FIG. 2. When closure member 68 is in the position shown in FIG. 2, an individual looking down into overfill prevention valve A can readily see that closure member 68 has moved to an unlatched position allowing the individual to verify the operability of main flow control member B as the closure member 68 and the components of latch 80 have functioned properly to allow closure member 68 to assume the testing position shown in FIG. 2. FIG. 2 also illustrates the lowermost position any component of testing member F can assume.

When the individual performing the test is no longer applying a downward force on test head 100, spring 116 causes test head 100, shaft 104, and actuator 118 to move upwardly to the non-testing position shown in FIG. 3. The upward movement of actuator 118 from a testing position to a non-testing position in turn causes actuator 128 to move upwardly and compress spring 122 due to the direct engagement of actuator 118 with surface 134 of actuator 128.

As is readily evident from FIG. 2, no portion of testing member F extends below closure member 68. Further, as shown in FIGS. 2 and 3, in the preferred form of the invention, all components of testing member F are entirely disposed in housing 30 in both the testing position and non-testing position. Moreover, the preferred embodiment utilizes direct contact between components of the testing member F and components of main flow control member B obviating any need for a magnetic attraction between components to test the operability of the overfill prevention valve A.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiments and have been written to preclude such a narrow construction using the principles of claim differentiation.

We claim:

1. An overfill prevention valve for a liquid storage tank, comprising:
    (a) a housing having a liquid inlet, a liquid outlet and a liquid flow passageway extending through said housing, said liquid flow passageway being configured to deliver a liquid to the liquid storage tank, said liquid inlet being positioned above said liquid outlet when said overfill prevention valve is in an operating position;
    (b) a moveable closure member disposed in said liquid flow passageway, said moveable closure member being moveable between a first position in which liquid is free to flow out said liquid outlet and a second position in which liquid is generally prevented from passing through said liquid outlet;
    (c) a float operably associated with said moveable closure member, said float being configured to allow said moveable closure member to move from the first position to the second position when liquid in the liquid storage tank has reached a predetermined level;
    (d) a tester having a test head, said tester being configured to test operability of said moveable closure member wherein a first portion of said tester contacts said moveable closure member during a test to test the operability of said moveable closure member; and,
    (e) a biasing member connected to said tester for biasing said tester to a non-testing position in which the moveable closure member permits a liquid to flow through said liquid outlet of said housing and said first portion of said tester does not contact said moveable closure member in the non-testing position, said biasing member being disposed in said liquid flow passageway.

2. An overfill prevention valve as set forth in claim 1, wherein:
    (a) said biasing member is a spring disposed in said liquid flow passageway.

3. An overfill prevention valve as set forth in claim 2, wherein:
    (a) said tester includes a shaft and said spring is mounted about said shaft.

4. An overfill prevention valve as set forth in claim 1, wherein:
    (a) at least a major portion of said tester is disposed in said housing and wherein when an individual applies a predetermined downward force on a portion of said tester, said tester causes said moveable closure member to move to a third position between said first position and said second position.

5. An overfill prevention valve as set forth in claim 4, wherein:
    (a) said tester includes a shaft, said test head is connected to an upper portion of said shaft, said test head being moveable between a non-testing position and a testing position when a user applies sufficient pressure on said test head to overcome a spring force of a spring, and wherein when said test head is in said non-testing position an uppermost surface of said shaft is disposed in said liquid flow passageway of said housing.

6. An overfill prevention valve as set forth in claim 5, wherein:
    (a) an uppermost surface of said test head forms an uppermost portion of said tester and the major portion of said test head is disposed in said liquid flow passageway of said housing when said test head is in said non-testing position.

7. An overfill prevention valve as set forth in claim 5, wherein:
    (a) said tester further includes an actuator head connected to a lower end of said shaft, said actuator head is configured to contact said moveable closure member to move said moveable closure member from said first position towards said second position.

8. An overfill prevention valve as set forth in claim 7, wherein:
    (a) said tester further includes an alignment member and a sleeve, said alignment member is slidably mounted in a hollow cavity extending through said sleeve, said sleeve is formed in said liquid flow passageway of said housing, said alignment member is connected to said actuator head and wherein said alignment member and said shaft move with said actuator head when a user applies a predetermined pressure on said test head.

9. An overfill prevention valve as set forth in claim 7, wherein:
    (a) said actuator head includes an inclined actuator surface, said inclined actuator surface is oriented such that an outermost portion of said inclined actuator surface is disposed below an innermost portion of said inclined actuator surface.

10. An overfill prevention valve for a liquid storage tank, comprising:
    (a) a housing having a liquid inlet, a liquid outlet and a liquid flow passageway extending through said housing from said liquid inlet to said liquid outlet;
    (b) a closure member for preventing flow of liquid out said liquid outlet, said closure member being positioned between said liquid inlet and said liquid outlet;
    (c) a float operably associated with said closure member, said float being configured to allow said closure member to move from an open position in which a liquid flows through said housing to the liquid storage tank to a closed position generally preventing a liquid from passing through said liquid outlet of said housing; and, (d) a tester having a test head, said tester being configured to test operability of said closure member, said tester being configured such that said test head moves downwardly from a non-testing position to a testing position to test operability of said closure member, said test head being disposed entirely within said liquid flow passageway of said housing when said test head is in a testing position and wherein in said testing position at least a portion of said closure member is visible to an individual.

11. An overfill prevention valve as set forth in claim 10, further including:

(a) a biasing member connected to said tester for biasing said tester to a non-testing position in which the closure member permits a liquid to flow through said liquid outlet of said housing, said biasing member being disposed in said liquid flow passageway.

12. An overfill prevention valve as set forth in claim 11, wherein:

(a) said biasing member is a spring disposed in said liquid flow passageway.

13. An overfill prevention valve as set forth in claim 12, wherein:

(a) said tester includes a shaft, and said spring is mounted about said shaft.

14. An overfill prevention valve as set forth in claim 13, wherein:

(a) said tester further includes an actuator head connected to a lower end of said shaft, said actuator head being configured to contact said closure member to move said closure member from said open position towards said closed position.

15. An overfill prevention valve as set forth in claim 14, wherein:

(a) said tester further includes an alignment member and a sleeve, said alignment member is slidably mounted in a hollow cavity extending through said sleeve, said sleeve is formed in said liquid flow passageway of said housing, said alignment member is connected to said actuator head and wherein said alignment member and said shaft move with said actuator head when a user applies a predetermined pressure on said tester.

16. An overfill prevention valve as set forth in claim 14, wherein:

(a) said actuator head includes an inclined actuator surface, said inclined actuator surface is oriented such that an outermost portion of said inclined actuator surface is disposed below an innermost portion of said inclined actuator surface.

17. An overfill prevention valve for a liquid storage tank, comprising:

(a) a housing having a liquid inlet, a liquid outlet and a liquid flow passageway extending through said housing from said liquid inlet to said liquid outlet;

(b) a closure member for preventing flow of liquid out said liquid outlet, said closure member being positioned between said liquid inlet and said liquid outlet;

(c) a float operably associated with said closure member, said float being configured to allow said closure member to move from an open position in which a liquid flows through said housing to the liquid storage tank to a closed position generally preventing a liquid from passing through said liquid outlet of said housing; and, (d) a tester having a test head, said tester being configured to test operability of said closure member, said tester being configured such that when a user depresses said tester, said tester engages said closure member to move said closure member from said open position towards said closed position and wherein at least a portion of said tester is disposed in said liquid flow passageway of said housing when said tester is in a non-testing position and a testing position.

18. An overfill prevention valve as set forth in claim 17, further including:

(a) a biasing member connected to said tester for biasing said tester to the non-testing position in which the closure member permits a liquid to flow through said liquid outlet of said housing, said biasing member is disposed in said liquid flow passageway.

19. An overfill prevention valve as set forth in claim 18, wherein:

(a) said biasing member is a spring disposed in said liquid flow passageway.

20. An overfill prevention valve as set forth in claim 19, wherein:

(a) said tester includes a shaft, and said spring is mounted about said shaft.

21. An overfill prevention valve for a fuel storage tank, comprising:

(a) a housing having a fuel inlet, a fuel outlet and a fuel flow passageway extending through said housing, said fuel flow passageway being configured to deliver fuel to the fuel storage tank, said fuel inlet being positioned above said fuel outlet when said overfill prevention valve is in an operating position;

(b) a moveable closure member disposed in said fuel flow passageway, said moveable closure member being moveable between a first position in which fuel is free to flow out said fuel outlet and a second position in which fuel is generally prevented from passing through said fuel outlet, said moveable closure member including a flapper moveable between said first position and said second position, and a latch, said latch including a moveable latch member which when engaged with a portion of said flapper holds said flapper in said first position, said latch further including a moveable catch member which when in a latched position maintains said flapper in said first position;

(c) a float operably associated with said moveable closure member, said float being configured to move said moveable catch member from said latched position to an unlatched position to allow said flapper of said moveable closure member to move from the first position towards the second position when fuel in the fuel storage tank has reached a predetermined level; and, (d) a tester having a test head, said tester being configured to test operability of said moveable closure member, said tester including a first actuator and a second actuator, said first actuator being configured to engage said moveable catch member and move said moveable catch member from said latched position to said unlatched position to allow said flapper of said moveable closure member to move from the first position towards the second position, said second actuator is configured to engage and move said flapper from said first position to a third position, wherein said third position is a position between said first position and said second position and wherein an individual can see at least a portion of said flapper when said flapper is in said third position to confirm operability of said moveable closure member.

22. An overfill prevention valve as set forth in claim 21, wherein:
- (a) said first actuator and said second actuator are disposed entirely within said housing between said fuel inlet and said fuel outlet; and,
- (b) said tester includes a first spring and a shaft, said test head is connected to an upper end of said shaft and said second actuator is connected to a lower end of said shaft, said first spring is mounted on said shaft between said test head and said second actuator; said first spring biases said tester to a non-testing position, said tester further includes a second spring mounted on said shaft below said first spring such that upon depression of the test head a first distance said shaft causes said second spring to force said first actuator downwardly to engage said moveable catch member and move said moveable catch member from said latched position to said unlatched position to allow said flapper of said moveable closure member to move from the first position toward the second position and wherein upon depression of said test head a second distance said shaft causes said second actuator to engage said flapper and move said flapper from said first position to said third position.

\* \* \* \* \*